United States Patent [19]

Kiekhaefer

[11] Patent Number: 4,649,766

[45] Date of Patent: Mar. 17, 1987

[54] REMOTE CONTROL APPARATUS

[75] Inventor: Fred C. Kiekhaefer, Chicago, Ill.

[73] Assignee: Kiekhaefer Aeromarine, Inc., Fond Du Lac, Wis.

[21] Appl. No.: 701,868

[22] Filed: Feb. 15, 1985

[51] Int. Cl.[4] .......................... G05G 5/06; F16C 1/10
[52] U.S. Cl. .................................. 74/475; 74/501 R; 74/501 A; 74/501 D; 74/527; 403/6
[58] Field of Search ............... 74/475, 489, 501 R, 74/501 A, 501 C, 501 D, 502, 527; 403/6, 11

[56] References Cited

U.S. PATENT DOCUMENTS

| 2,277,767 | 0/1942 | La Brie | 74/537 |
| 3,104,559 | 9/1963 | Dotter | 74/502 |
| 3,406,587 | 0/1968 | Brilando et al. | 74/475 |
| 3,481,217 | 12/1969 | Maeda | 74/489 |
| 3,534,627 | 0/1970 | Schwerdhofer | 74/489 |
| 4,034,622 | 7/1977 | Deck | 74/501 D |
| 4,069,721 | 1/1978 | Ezaki et al. | 74/501 R |
| 4,078,449 | 0/1978 | Kelly | 74/527 |
| 4,116,086 | 0/1978 | Langford et al. | 74/475 |
| 4,189,954 | 2/1980 | Nakamura et al. | 74/501 A |
| 4,267,744 | 5/1981 | Yamasaki | 74/527 |
| 4,270,402 | 6/1981 | Nagano | 74/501 A |
| 4,553,449 | 11/1985 | Korn | 74/501 R |

Primary Examiner—George L. Walton
Attorney, Agent, or Firm—Andrus, Sceales, Starke & Sawall

[57] ABSTRACT

A control member of a remote control apparatus is provided with a first engagement member. A second engagement member is provided on the end of the core wire of a push-pull cable. The core wire and second engagement member are inserted through an opening in the control apparatus housing to effect engagement of the engagement members. The engagement members thereafter effect a pivoted connection therebetween as the cable is pivoted relative to the control member through an opening in the housing. The sheath of the pivoted push-pull cable is pivotally secured relative to the control apparatus housing.

4 Claims, 5 Drawing Figures

REMOTE CONTROL APPARATUS

BACKGROUND OF THE INVENTION

This invention relates to a remote control apparatus.

Remote control apparatus are commonly utilized to perform selected control functins, such for example, as controlling an engine throttle, shifting reversing gears, brake or clutch operation, etc. Such apparatus generally comprises a control unit for actuating a push-pull cable which extends and is connected to a remote control function element and actuates the latter in accordance with hand manipulation of the control unit.

Upon installation of such apparatus, it is generally necessary to make a time consuming disassembly of the control unit in order to connect the push-pull cable thereto, and thereafter to reassemble the unit. It is generally an object of this invention to provide for installation of a push-pull cable relative to a remote control unit without the need for a disassembly of the control unit.

SUMMARY OF THE INVENTION

Broadly, a remote control apparatus includes a housing having transversely opposed side walls. A control member is disposed between the side walls for pivotal movement on a transverse axis and carries a first engagement member in spaced relation from the pivot axis. The housing is provided with an open end portion and the first engagement member is disposed generally adjacent to the open end portion. A push-pull cable for connection to the apparatus comprises relatively movable core wire and sheath. A second engagement member is provided on the end of the cable core wire. The core wire is insertable through the open end portion of the housing to effect engagement between the engagement members. The engagement members effect a pivotal connection therebetween as the cable is pivoted through the open end portion and adjacent open bottom portion of the housing where means are provided for pivotally securing the cable sheath relative to the housing.

DESCRIPTION OF THE DRAWING FIGURES

The drawing furnished herewith illustrate the best mode presently contemplated and are described hereinafter.

DESCRIPTION OF THE ILLUSTRATED EMBODIMENT

Figure 1:
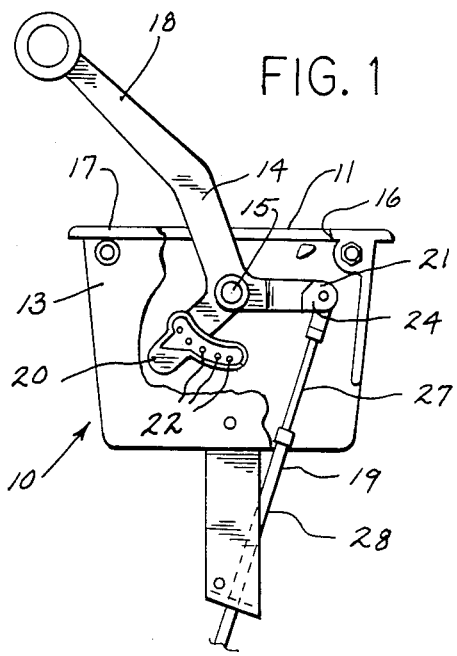
FIG. 1 is a side elevation with parts broken away of the remote control apparatus of this invention.
Figure 2:
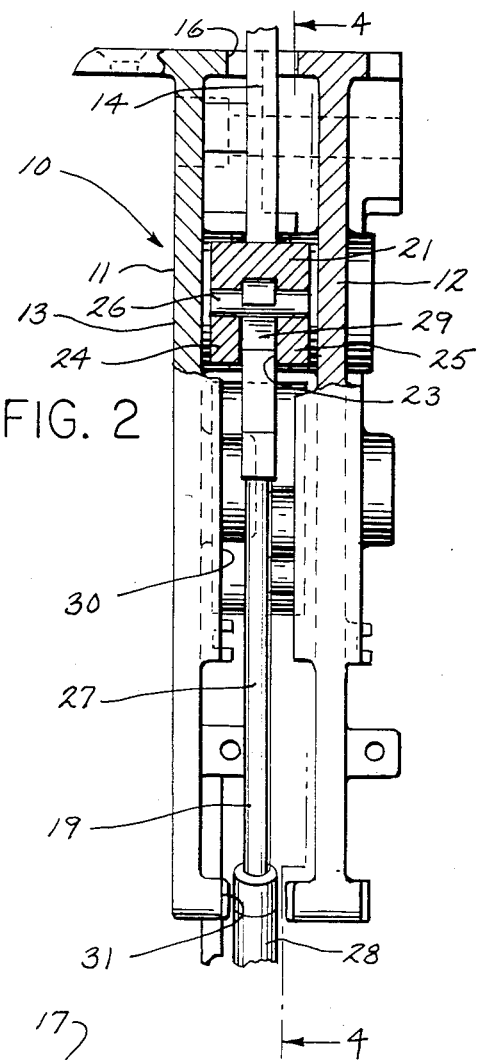
FIG. 2 is an enlarged end elevation with parts broken away and sectioned of the remote control apparatus.

Referring to the drawings, the remote control apparatus 10 includes a housing 11 having opposed side walls 12 and 13 which mount the control lever 14 at the pivot 15 therebetween. The control lever 14 extends upwardly through an elongated slot 16 at the top 17 of the housing 11 to present upwardly projecting handle means 18 for hand manipulation. The control lever 14 is pivotally manipulatable to actuate the push-pull cable 19 and thereby correspondingly actuate a control function member, not shown, remote from the apparatus 10.

Control lever 14 is formed with a pair of generally opposed arms 20 and 21 which extend generally radially from the pivot 15. The arm 20, which extends generally to the rear as shown in FIG. 1, is provided with a plurality of depressions or holes 22 at a given radius from the axis of the pivot 15. The depressions or holes 22 are selectively engaged by a dentent ball, not shown, mounted in the wall 13 to hold or retain the lever 14 in selective operating positions.

Ordinarily, to connect a push-pull cable to a remote control apparatus, it is necessary to disassemble the apparatus, make the necessary connections, and thereafter reassemble the apparatus. That need is eliminated by the present invention.

According to the present invention, the arm 21 on control lever 14 extends generally forwardly as shown in FIG. 1 and is provided with a forwardly opening recess 23 at the remote end thereof between side members 24 and 25 that generally parallel the housing side walls 12 and 13. A clevis rod 26 extends transversely through the recess 23, being press fit in axially aligned openings in the opposed side members 24 and 25.

The push-pull cable 19 generally comprises a core wire 27 which projects fromand is movable relative to its sheath 28. A clevis hook 29 is secured on the end of the core wire 27.

Figure 3:
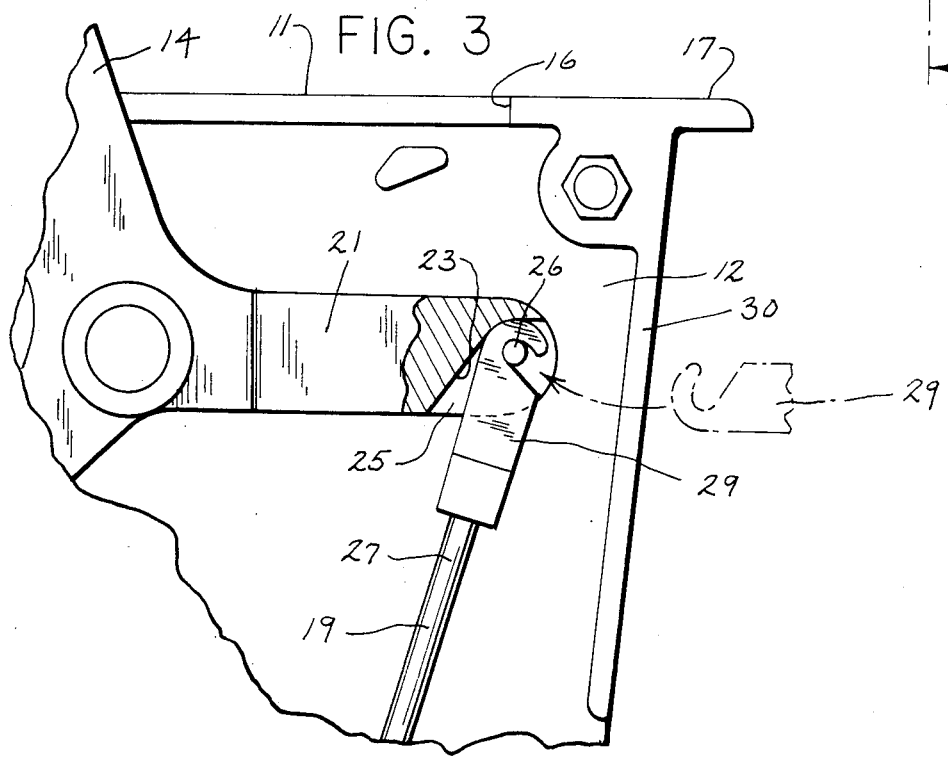
FIG. 3 is enlarge elevational detail showing the end of the push-pull cable attached to the actuating member of the control unit, and in the dotted line showing how the end of the push-pull cable is attached to the actuating member.
Figure 4:
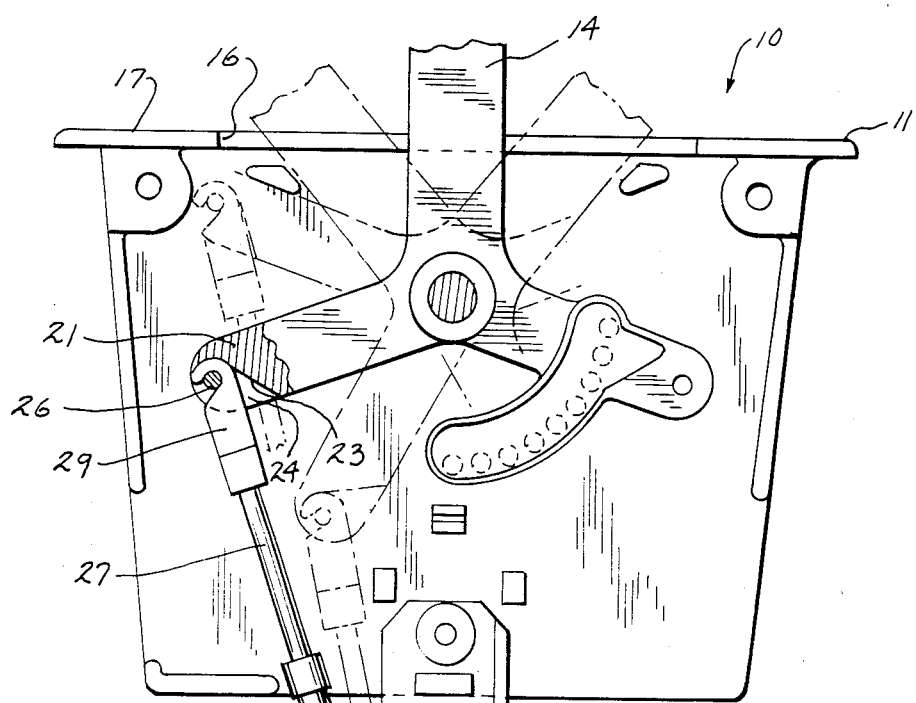
FIG. 4 is a view generally taken on line 4—4 of FIG. 2 with parts broken away and shows the actuating member of the control unit in various operating positions with the push-pull cable connected thereto.
Figure 5:
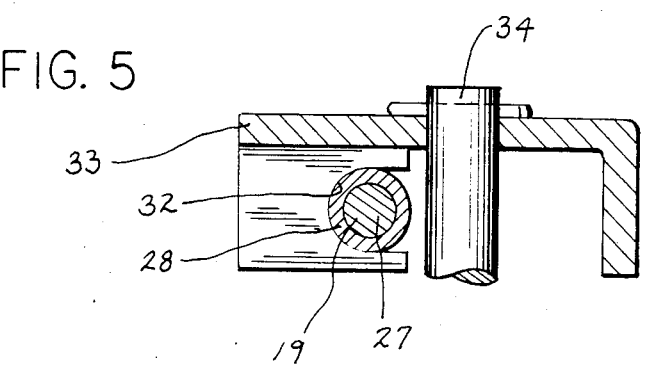
FIG. 5 is an enlarged sectional view taken generally on line 5—5 of FIG. 4.

Forwardly the housing 11 is provided with an elongated slot 30 through which the core wire 27 with clevis hook 29 may be inserted into the housing. The slot 30 is generally aligned with the recess 23 in the end of the arm 21, and as generally shown in FIG. 3, the clevis hook 29 is engaged under the clevis rod 26 in the recess and the cable 19 rotated relative to the rod. With rotation of the cable 19, the clevis hook 29 is pivoted over the upper face of the clevis rod 26 while the cable is rotated downwardly through the slot 30 and through the housing bottom slot 31 which communicates with the slot 30. The cable sheath 28 is disposed in the rearwardly opening recess 32 at the bottom of the stand-off bracket 33 fixed to and projecting down from the housing 11. As generally shown in FIG. 4, the cable 19 is pivoted with respect to the bracket 33 to accommodate the operating movements of the arm 21, while a pin 34 or the like precludes a disengagement of the cable sheath 28 from the bracket recess 32.

In the recess 23 of the arm 21, the distance between the clevis rod 26 and the bottom of the recess is merely adequate to accommodate rotation of the clevis hook 29 relative to the rod such that the hook is otherwise entrapped relative to the arm.

The invention thus provides for connection of a push-pull cable relative to a remote control apparatus without need for the disassembly of the latter. The connection is effected with relative ease and without use of tools.

Various modes of carrying out the invention are contemplated as being within the scope of the following claims particularly pointing out and distinctly claiming the subject matter which is regarded as the invention.

I claim:

1. In a remote control apparatus having a housing including opposed side walls, a control member disposed between said side walls for pivotal movement on a transverse axis and carrying a first engagement member in spaced relation from the pivot axis, said housing having an open end portion and said first engagement member being disposed generally adjacent thereto, a push-pull cable comprising relatively movable core wire and sheath, a second engagement member disposed on the end of the cable core wire, said core wire being insertable through the open end portion of said housing to effect a releasable engagement between said engagement members without disassembly of any elements of said control apparatus, said engagement members effecting a pivotal connection therebetween as the cable is pivoted relative to the control member through the open end portion and adjacent open bottom portion of the housing, and means for pivotally securing the cable sheath to the housing to preclude separation of said engagement members during operation of said control apparatus.

2. The structure set forth in claim 1 wherein the first engagement member is a transversely extending rod member and the second engagement member comprises hook means engageable on said rod member.

3. In a remote control apparatus having a housing including oppsed side walls, a control lever mounted between said side walls for pivotal movement on a transverse axis, a radially extending arm on said control lever, said arm carrying a transversely extending rod member in spaced relation from the control lever axis, said housing having an open end portion and an open bottom portion in communication with each other and generally adjacent to said arm, a push-pull cable comprising relatively movable core wire and sheath, hook means disposed on the end of the cable core wire, said core wire being insertable through the open end portion of said housing to effect a releasable engagement of the hook means on the rod carried by said arm without disassembly of any elements of said control apparatus, said hook means and rod effecting a pivotal connection therebetween as the cable is pivoted relative to the arm through the open end portion and open bottom portion of sheath relative to the control apparatus housing to preclude separation of said engagement members during operation of said control apparatus.

4. The structure as set forth in claim 3 wherein the transversely extending rod member spans a recess at the remote end of the control lever arm, and the hook means on the core wire of the push-pull cable engages with the rod member within the recess.

* * * * *